United States Patent
Cheng et al.

(10) Patent No.: US 10,740,254 B2
(45) Date of Patent: Aug. 11, 2020

(54) SYSTEM AND METHOD FOR FRAME BUFFER COPY DURING PARTIAL POWER DOWN OF MEMORY

(75) Inventors: Christopher Thomas Cheng, Santa Clara, CA (US); Sau Yan Keith Li, Ontario (CA); Thomas Edward Dewey, Menlo Park, CA (US); Franciscus W. Sijstermans, Los Altos Hills, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 415 days.

(21) Appl. No.: 13/475,830

(22) Filed: May 18, 2012

(65) Prior Publication Data
US 2013/0169656 A1 Jul. 4, 2013

Related U.S. Application Data

(60) Provisional application No. 61/582,790, filed on Jan. 3, 2012.

(51) Int. Cl.
*G06F 13/16* (2006.01)

(52) U.S. Cl.
CPC .............. *G06F 13/16* (2013.01); *Y02D 10/14* (2018.01)

(58) Field of Classification Search
CPC .......... G09G 5/397; G09G 5/00; G06F 12/02; G06F 15/80; G06F 13/372; G06F 13/38; Y02B 60/1228; Y02B 60/1235

USPC .......................................................... 345/534
See application file for complete search history.

(56) References Cited

U.S. PATENT DOCUMENTS

| | | | |
|---|---|---|---|
| 6,515,672 B1 * | 2/2003 | Sheaffer et al. .............. | 345/534 |
| 7,830,392 B1 * | 11/2010 | Danskin ................ | G06T 15/005 |
| | | | 345/426 |
| 2008/0100636 A1 * | 5/2008 | Lai ........................... | G09G 5/39 |
| | | | 345/546 |
| 2011/0084977 A1 * | 4/2011 | Duluk et al. ................... | 345/522 |
| 2011/0084979 A1 * | 4/2011 | Rutman et al. ............... | 345/589 |

* cited by examiner

*Primary Examiner* — Barry Drennan
*Assistant Examiner* — Khoa Vu
(74) *Attorney, Agent, or Firm* — Zilka-Kotab, P.C.

(57) ABSTRACT

Embodiments of the present invention may be directed to a graphics system of a computer system. The system may include a frame buffer having a number of partitions respectively mapped to a number of discrete memory devices and a dedicated copy buffer operable to store new image frames, mapped to a first memory device. The first memory device corresponds to a first partition of the number of partitions. The system may also include a loader circuit coupled between the frame buffer and the dedicated copy buffer, operable to copy new image frames from the frame buffer to the dedicated copy buffer. The system may also include a clocked output coupled to receive an image frame from the dedicated copy buffer and operable to drive a display device therewith. The system may enter a low power state wherein a number of the discrete memory devices are powered off.

16 Claims, 7 Drawing Sheets

SYSTEM AND METHOD FOR FRAME BUFFER COPY DURING PARTIAL POWER DOWN OF MEMORY

CROSS-REFERENCE TO RELATED APPLICATION

This application claims priority from U.S. Provisional Application No. 61/582,790, filed Jan. 3, 2012, entitled "OPPORTUNISTIC FRAME BUFFER COPY FOR EFFICIENT MEMORY PARTIAL POWER DOWN," by Cheng et al., which is hereby incorporated by reference.

BACKGROUND OF THE INVENTION

Graphics subsystems commonly include a graphics processing unit that generates frame data for storage in a frame buffer prior to display. Typically, with graphics processing units, many components (display, graphics, memory, etc.) share a same power rail within a graphics subsystem. Even if some of the components are not being used, there is a large power drain on a user's system. In the case of memory, even if memory is not being used, memory devices cause a large power drain on the user's system.

Display requires power at all times. Even if a user is not interacting with the system, the screen must be active and refreshed every frame. This scenario is very common and is a large contributor to decreased battery life of the user's system. Because the display typically shares the same power rail as other components within the graphics subsystem, the power rail cannot be completely shut off for power savings. It would be advantageous to power off memory devices within the graphics subsystem for the purpose of conserving the user's system power.

Some specifications have attempted to address power down of memory devices when a duplicate image frame generated by the graphics processing unit is detected. Such specifications have used a cyclic redundancy check to compare a newly generated frame to a previously generated frame in order to detect if the frames are identical. If the frames are identical, some or all of the memory devices are powered down until a newly generated frame that is not identical to the prior frames is generated by the graphics processing unit. These specifications have a multiple step method of entering a low power state comprising detecting a repeated frame, snooping the frame, entering a low power state, exiting a low power state, and displaying an updated frame. This multiple step method creates an unwanted wake up latency within the user's system due to the limited responsiveness of the solution due to the many stages involved to enter and exit power down.

BRIEF SUMMARY OF THE INVENTION

Accordingly, a need exists to enter and exit a low power state within a graphics subsystem with low latency. Generally, greater power savings results in greater latency. The desire is to both maximize power savings and minimize latency.

Embodiments of the present invention are directed to a system for driving a display. More specifically, the system may include a frame buffer including a number of partitions respectively mapped to a number of discrete memory devices and a dedicated copy buffer mapped to only a first memory device of the number of discrete memory devices. The first memory device corresponds to a first partition of the number of partitions. The dedicated copy buffer is operable to store new image frames. The system may also include a loader circuit coupled between the frame buffer and the dedicated copy buffer. The loader circuit is operable to opportunistically copy new image frames from the frame buffer to the dedicated copy buffer, responsive to the new image frames being copied into the frame buffer. The system may also include a clocked output coupled to receive an image frame from the dedicated copy buffer and operable to drive a display device therewith. Upon the detection of a duplicate frame, the majority of the partitions of the frame buffer are powered down, except for a first partition. During this low power mode, the refresh signal is generated based on the dedicated copy buffer content. Upon receipt of a new frame, the low power mode is exited and the partitions return to full power.

Another embodiment of the present invention may be directed to a method of generating a refresh signal. More specifically, the method may include accessing a frame of data from a graphics processing unit, storing the frame of data into a number of partitions within a frame buffer, copying the frame of data from the number of partitions to a dedicated copy buffer, detecting a repeated frame of data subsequent to the frame of data, and refreshing a display device using data from the dedicated copy buffer upon detecting the repeated frame of data and entering a low power state. One or more partitions of the number of partitions may be powered down in the low power state. In an embodiment, N-1 partitions out of N partitions may be powered down in the low power state.

Other embodiments of the present invention may be directed to a method of supplying frame data for display. More specifically, the method may include bursting a frame of data from a frame buffer to a copy buffer within a first portion of a duty cycle of a system, periodically bursting data from said copy buffer to an intermediary buffer of a clocked output circuit within a second portion of the duty cycle of the system, generating a frame refresh signal by reading contents of the intermediary buffer and supplying frame data at a refresh clock rate suitable for a display device, and placing a plurality of memory devices into a low power state. A number of memory devices, except a first memory device, may be placed into a low power state during the second portion of the duty cycle. The first memory device may be placed into the low power state when not bursting data.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Figure 1:
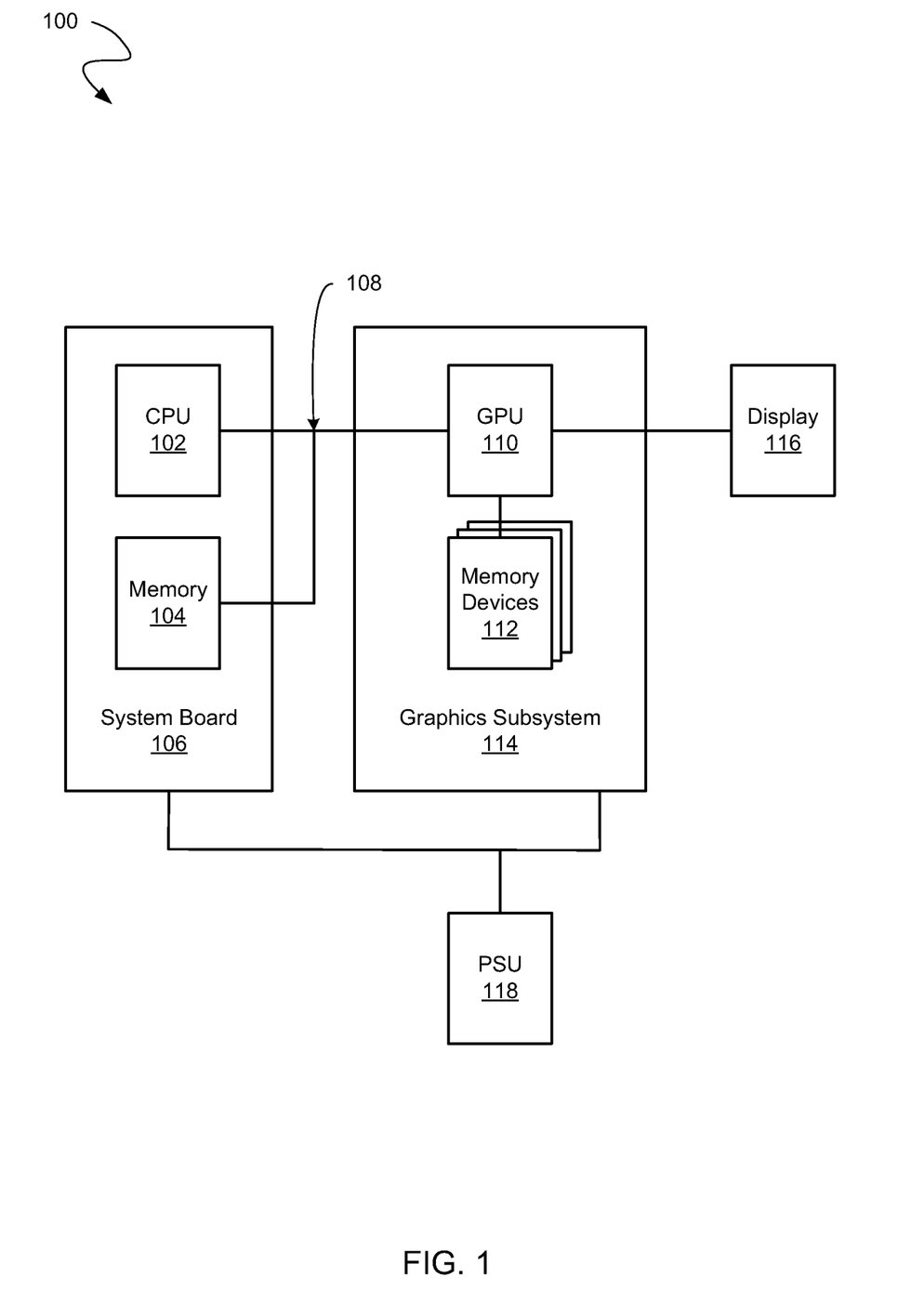
FIG. 1 shows an exemplary computer system, in accordance with one embodiment of the present invention.

FIG. 1 shows an exemplary computer system 100 in accordance with one embodiment of the present invention. Computer system 100 depicts the components in accordance with embodiments of the present invention providing the execution platform for certain hardware-based and software-based functionality. In general, computer system 100 comprises a system board 106 including at least one central processing unit (CPU) 102 and a system memory 104. The CPU 102 can be coupled to the system memory 104 via a bridge component/memory controller (not shown) or can be directly coupled to the system memory 104 via a memory controller (not shown) internal to the CPU 102.

Computer system 100 also comprises a graphics subsystem 114 including at least one graphics processor unit (GPU) 110. For example, the graphics subsystem 114 may be included on a graphics card. The graphics subsystem 114 may be coupled to a display 116. One or more additional GPU(s) 110 can optionally be coupled to computer system 100 to further increase its computational power. The GPU(s) 110 may be coupled to the CPU 102 and the system memory 104 via a communication bus 108. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, memory devices 112 may be coupled with the GPU 110 for high bandwidth graphics data storage, e.g., the frame buffer. In an embodiment, the memory devices 112 may be dynamic random-access memory. A power source unit (PSU) 118 may provide electrical power to the system board 106 and graphics subsystem 114.

The CPU 102 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 102. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 102 coupled to a dedicated graphics rendering GPU 110. In such an embodiment, components can be included that add peripheral buses, specialized audio/video components, IO devices, and the like. Similarly, system 100 can be implemented as a portable device (e.g., cellphone, PDA, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 102, 104, 110, 112, and the like) of a computing device are wholly contained within a single integrated circuit die. Examples include a hand-held instrument with a display, a car navigation system, a portable entertainment system, and the like.

Opportunistic Frame Buffer Copy for Efficient Memory Partial Power Down

Figure 2A:
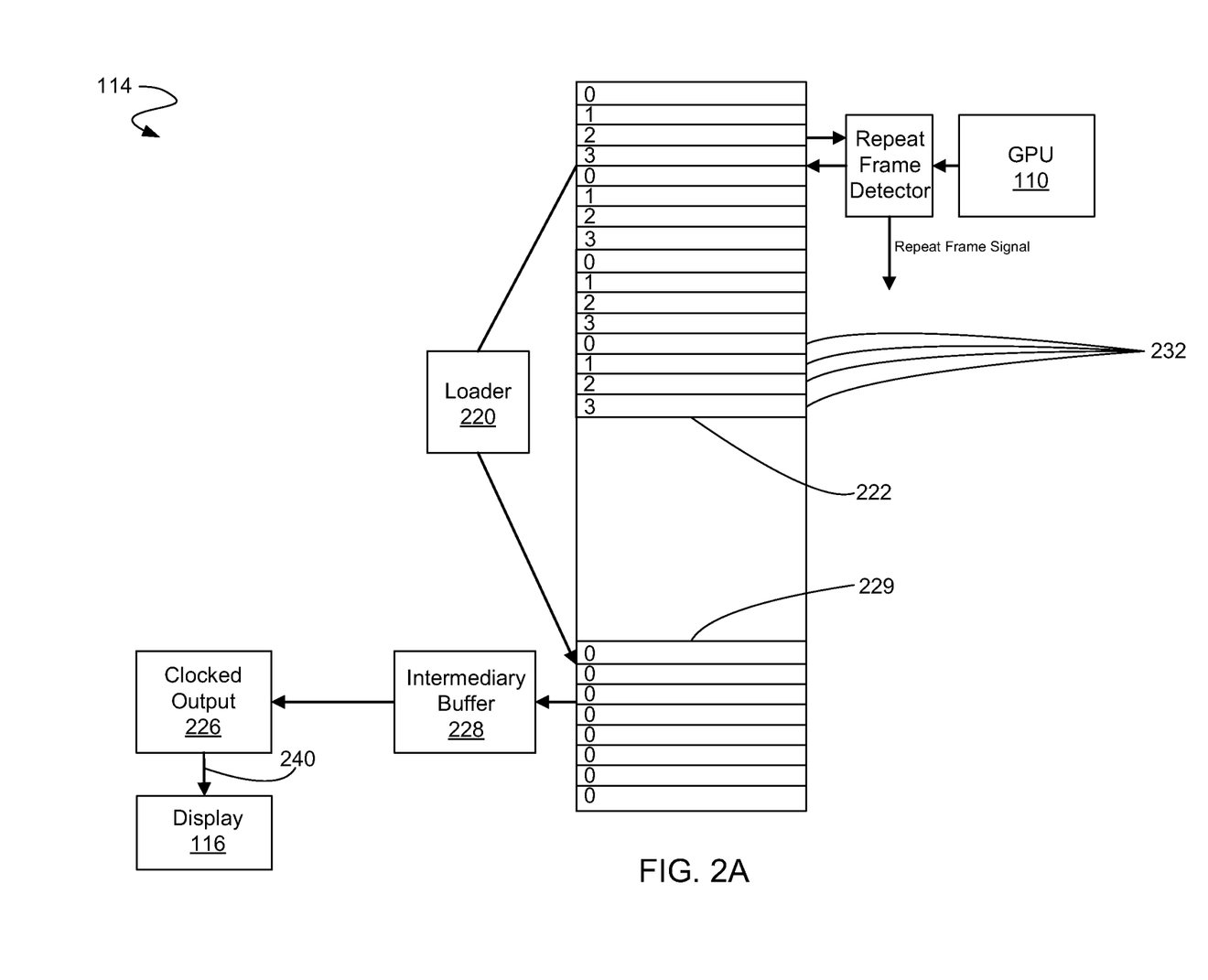
FIG. 2A shows a block diagram of components of a graphics subsystem in accordance with one embodiment of the present invention.

FIG. 2A shows a block diagram of components of a graphics subsystem 114 in accordance with one embodiment of the present invention. The graphics subsystem 114 comprises of a graphics processing unit 110, loader circuit 220, frame buffer 222, clocked output 226, intermediary buffer 228, and dedicated copy buffer 229. In an embodiment, the graphics subsystem is operable to drive a display device 116.

The frame buffer 222 is operable to store an image frame that is generated by the graphics processing unit 110. The graphics processing unit 110 is a specialized circuit designed to rapidly manipulate and alter image data in such a way so as to accelerate the rendering of image frames in the frame buffer 222 intended for output to the display device 116. Upon generation of each image frame by the graphics processing unit 110, the image frame is stored in the frame buffer 222.

The frame buffer 222 comprises a plurality of partitions 232 respectively mapped to a plurality of discrete memory devices 112 (FIG. 1). In this particular embodiment, there are four partitions 232 respectively mapped to four discrete memory devices 112 (FIG. 1) within the graphics subsystem 114: Partition0, Partition1, Partition2, and Partition3. For load sharing balancing, the plurality of partitions 232 is interleaved across an address space of the frame buffer 222. The address space maps the plurality of partitions 232 to their respective discrete memory devices 112 (FIG. 1). For example, Partition0 may be mapped to a first discrete memory device 112, Partition1 may be mapped to a second discrete memory device 112, Partition2 may be mapped to a third discrete memory device 112, and Partition3 may be mapped to a fourth discrete memory device 112.

The graphics subsystem 114 also comprises a dedicated copy buffer 229. The dedicated copy buffer 229 is mapped only to a first memory device 112 (FIG. 1) of the plurality of discrete memory devices 112 (FIG. 1). For example, the dedicated copy buffer 229 is mapped to a first discrete memory device 112 (FIG. 1), the same discrete memory device 112 to which Partition0 is mapped.

The dedicated copy buffer 229 is operable to store new image frames generated by the graphics processing unit 110. Upon the graphics processing unit 110 generating a new image frame, the new image frame is stored in the frame buffer 222 and opportunistically contemporaneously (e.g., within a few milliseconds) copied into the dedicated copy buffer 229 by a loader circuit 220. The term opportunistically is used because the dedicated copy buffer 229 will be used to refresh the display device 116 during periods of power down when duplicate frames are being received by the graphics processing unit 110 and the main frame buffer 222 will be partially powered down. The dedicated copy buffer 229, however, is pre-loaded with each frame, whether or not a duplicate condition is detected.

The dedicated copy buffer 229 contains a bit for bit copy of the image frame stored in the frame buffer 222. Because the dedicated copy buffer 229 is mapped to a first discrete memory device 112 (FIG. 1) of the plurality of memory devices 112 (FIG. 1), a copy of the image frame resides on an individual discrete memory device 112 (FIG. 1). The dedicated copy buffer 229 is transparent to an operating system controlling the system 100 (FIG. 1).

The loader circuit 220 is coupled between the frame buffer 222 and the dedicated copy buffer 229. The loader circuit 220 is operable to copy new image frames from the frame buffer 222 to the dedicated copy buffer 229 responsive to the new image frames being copied into the frame buffer 222. Once the graphics processing unit 110 has generated a new image frame and stored it in the frame buffer 222, the loader circuit 220 copies (e.g., bursts) the new image frame from the frame buffer 222 into the dedicated copy buffer 229 very rapidly.

The graphics subsystem 114 also comprises an intermediary buffer 228. The intermediary buffer 228 is coupled between the dedicated copy buffer 229 and a clocked output 226. The intermediary buffer 228 is operable to receive a plurality of bursts of portions of the image frame from the dedicated copy buffer 229 during a portion of a duty cycle of the system 100 (FIG. 1). The intermediary buffer 228 is operable to buffer data from the dedicated copy buffer 229 prior to the data being used to drive the display device 116 by the clocked output 226. The clocked output 226 supplies frame data to the display device 116 at a refresh clock rate that is suitable for the display device 116.

The graphics subsystem 114 is capable of being in a low power state in order to conserve power of the system 100 (FIG. 1). The graphics subsystem 114 enters a low power state upon the graphics subsystem 114 detecting a repeated image frame generated by the graphics processing unit 110. Upon detecting a repeated (e.g., duplicate) image frame, all of the plurality of memory devices 112 (FIG. 1), except for the first memory device 112 (FIG. 1), are powered down in order to partially power down the frame buffer 222. In the low power state, the loader circuit 220 no longer copies an image frame from the frame buffer 222 into the dedicated copy buffer 229. The intermediary buffer 228 continues to receive a plurality of bursts of a portion of the image frame during a portion of a duty cycle of the system 100 (FIG. 1) from the dedicated copy buffer 229. In other words, the dedicated copy buffer 229 is operable for providing image frames to the clocked output 226 during the low power state to maintain the refresh output signal 240.

Repeated image frames typically occur when a user is not interacting with the system 100 (FIG. 1), resulting in the display device 116 outputting a constant image. The low power state reduces power costs for the graphics subsystem 114 and results in power savings for the system 100 (FIG. 1) by powering down the memory devices 112, except the first partition being used by the dedicated copy buffer 229. The graphics subsystem 114 will continue to remain in the low power state upon detection of consecutive repeated image frames. The graphics subsystem 114 exits the low power state once the graphics subsystem 114 detects a new image frame different from prior image frames generated by the graphics processing unit 110.

In another embodiment, the first memory device 112 (FIG. 1) of the plurality of memory devices 112 (FIG. 1) may be powered down for portions of the duty cycle of the system 100 (FIG. 1). During normal operation of the graphics subsystem 114 (e.g., graphics subsystem 114 is not in the low power state), the new image frame generated by the graphics processing unit 110 is stored in the frame buffer 222 and contemporaneously (e.g., within a few milliseconds) copied into the dedicated copy buffer 229. Thereafter, the intermediary buffer 228 receives a plurality of bursts of portions of the copied image frame from the dedicated copy buffer 229. Because the dedicated copy buffer 229 is mapped to a first discrete memory device 112 (FIG. 1) of the plurality of memory devices 112 (FIG. 1), all other memory devices 112 (FIG. 1) of the plurality of memory devices 112 (FIG. 1) may be powered down. Additionally, the first memory device 112 (FIG. 1) may be powered down in between the plurality of bursts of portions of the coped image to the intermediary buffer 228 (See FIG. 3B).

Figure 2B:
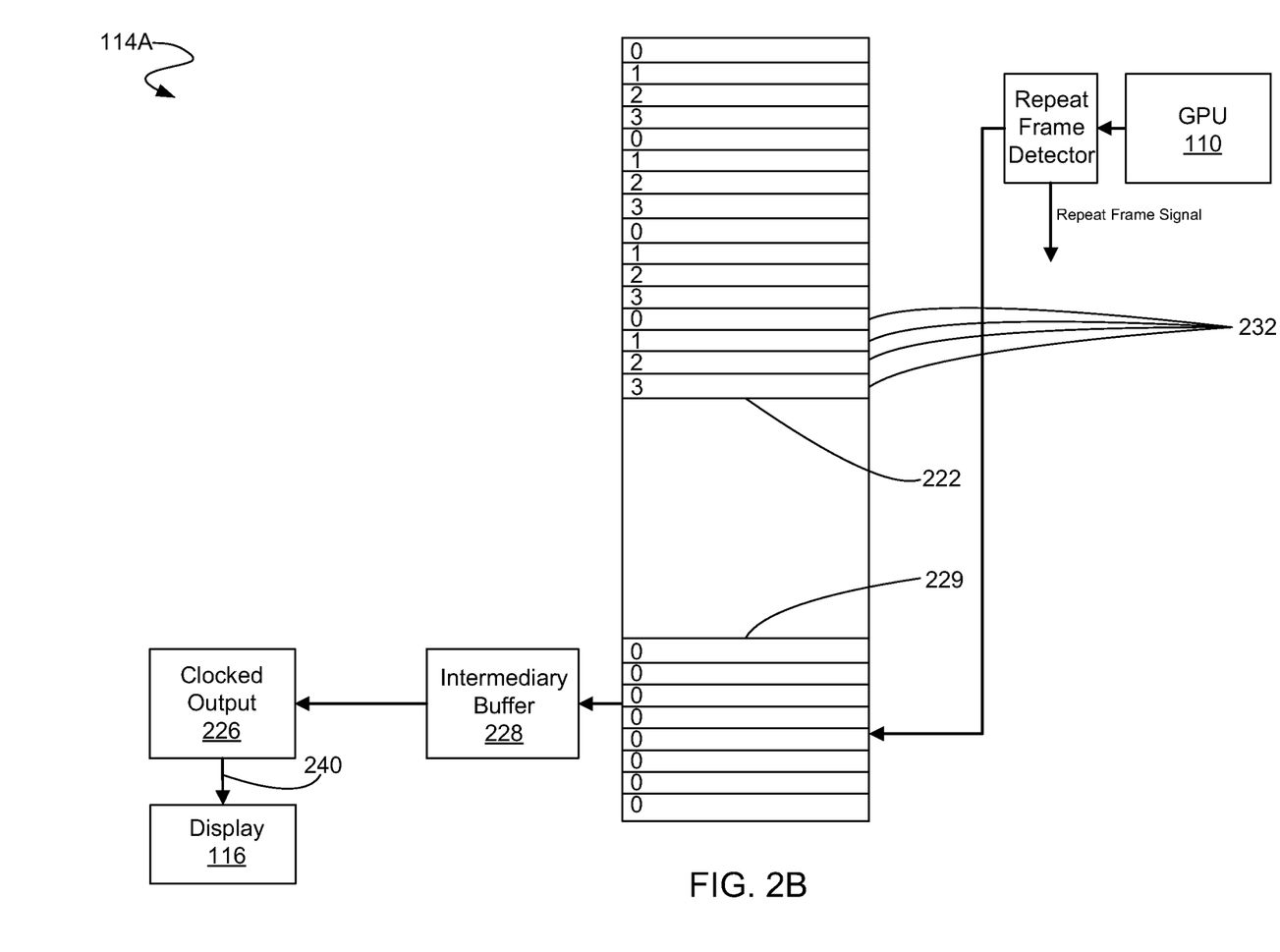
FIG. 2B shows a block diagram of components of a graphics subsystem in accordance with one embodiment of the present invention.

FIG. 2B shows a block diagram of components of a graphics subsystem in accordance with one embodiment of the present invention. FIG. 2B is analogous to FIG. 2A except that loader circuit 220 (FIG. 2A) is not present in graphics subsystem 114a and GPU 110 renders directly to the dedicated copy buffer 229 (via a repeat frame detector).

In am embodiment, GPU 110 renders directly to the dedicated copy buffer 229. GPU 110 rendering directly to dedicated copy buffer 229 saves memory bandwidth because a loader circuit 220 (FIG. 2A) is not required to copy each frame from the frame buffer 222 (FIG. 2A) to the dedicated copy buffer (FIG. 2A).

Figure 3A:
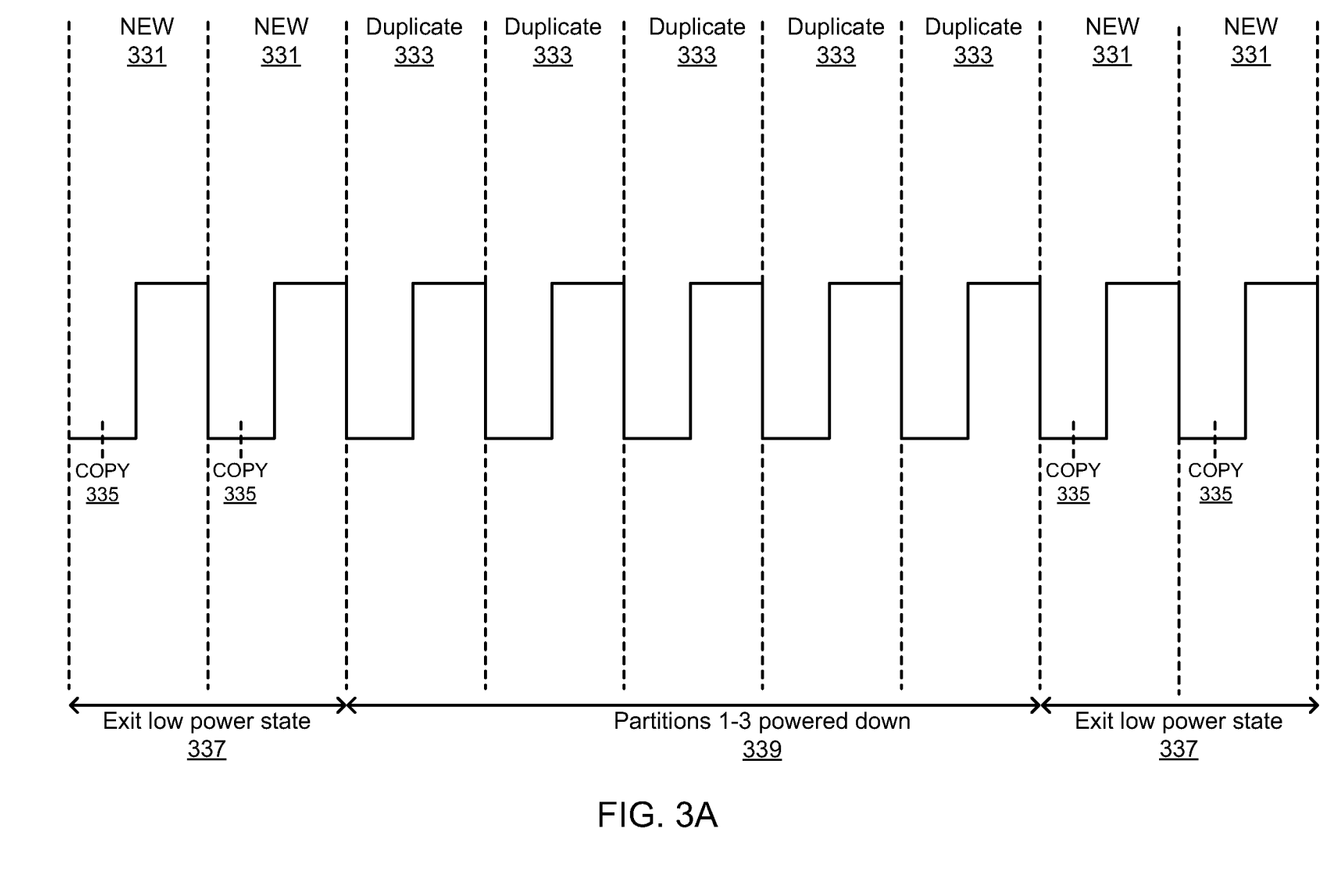
FIG. 3A shows a timing diagram of memory devices within a graphics subsystem in accordance with one embodiment of the present invention.

FIG. 3A shows a timing diagram of memory devices within a graphics subsystem in accordance with one embodiment of the present invention. The timing diagram illustrates the copying of new image frames from the frame buffer 222 (FIG. 2A) to the dedicated copy buffer 229 (FIG. 2A) and all of the plurality of memory devices 112 (FIG. 1), except for the first memory device 112 (FIG. 1), powering down upon detection of a duplicate image frame.

Upon the graphics subsystem 114 detecting a new image frame 331, the new image frame 331 is copied 335 from the frame buffer 222 (FIG. 2A) to the dedicated copy buffer 229 (FIG. 2A). If the graphics subsystem 114 was in a low power state prior to detecting the new image frame 331, the graphics subsystem 114 (FIG. 1) exists the low power state 337. The graphics subsystem 114 (FIG. 1) continues to copy 335 each new image frame 331 from the frame buffer 222 (FIG. 2A) to the dedicated copy buffer 229 (FIG. 2A) until the graphics subsystem 114 (FIG. 1) detects a duplicate image frame 333.

Upon the graphics subsystem 114 detecting a duplicate image frame 333, the graphics subsystem 114 enters the low power state and all of the plurality of memory devices 112 (FIG. 1), except for the first memory device 112 (FIG. 1), are powered down 339 in order to partially power down the frame buffer 222 (FIG. 2A). In this particular embodiment, memory devices 112 (FIG. 1) corresponding to Partition1, Partition2, and Partition 3 (e.g. Memory0, Memory1, and Memory3) are powered down 339.

During the low power state, the image frame stored in the frame buffer 222 (FIG. 2A) is no longer copied to the dedicated copy buffer 229 (FIG. 2A). The plurality of memory devices 112 (FIG. 1), except for the first memory device 112 (FIG. 1), remain powered down 339 until the graphics subsystem 114 detects a new image frame 331. Upon the graphics subsystem 114 detecting a new image frame 331, the plurality of memory devices 112 (FIG. 1), except for the first memory device 112 (FIG. 1), exit the low power state 337 and continue normal operation (e.g., copying a new image frame from the frame buffer 222 (FIG. 2A) to the dedicated copy buffer 229 (FIG. 2A)).

Figure 3B:
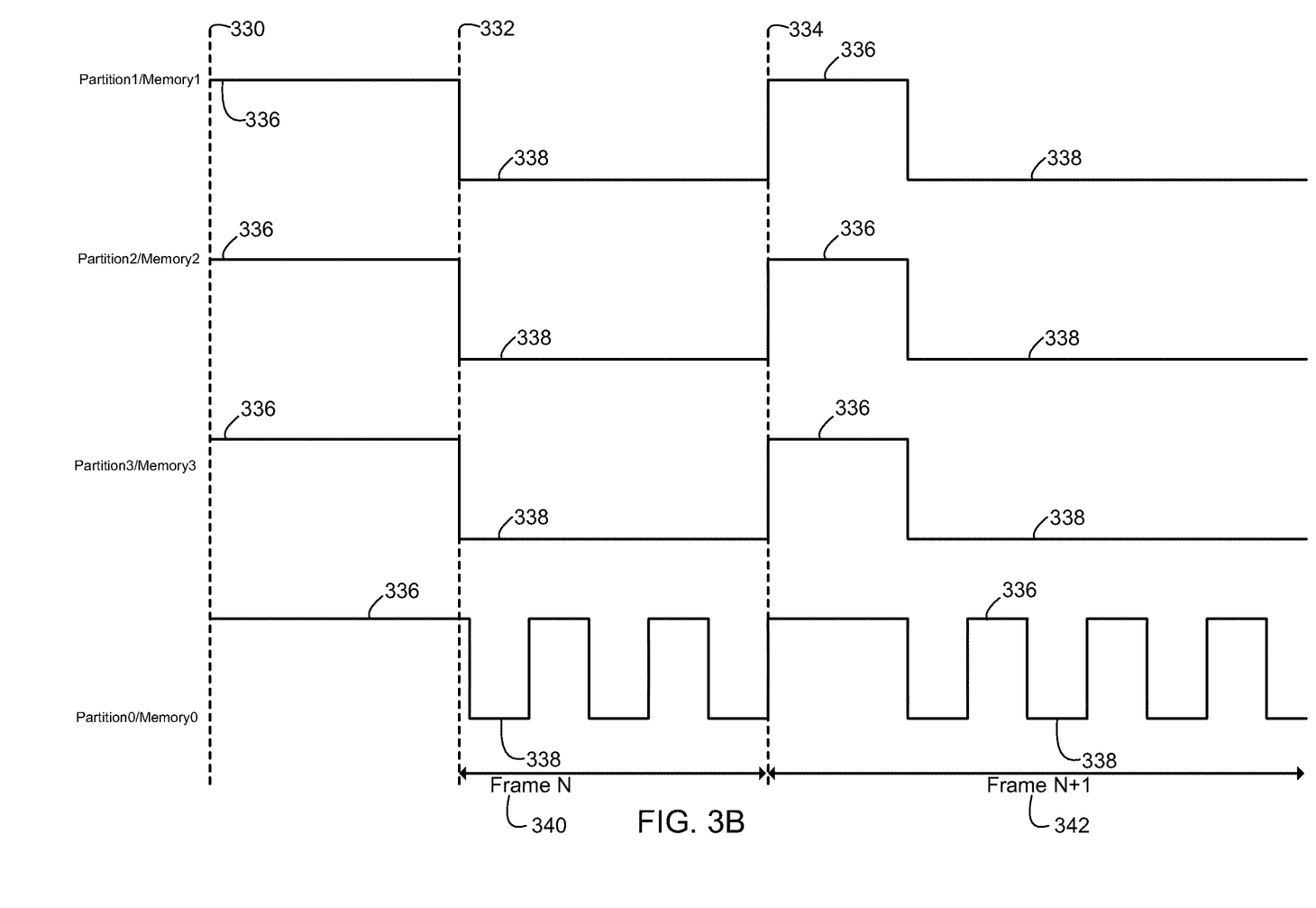
FIG. 3B shows a power timing diagram of memory devices within a graphics subsystem in accordance with one embodiment of the present invention.

FIG. 3B shows a power timing diagram of discrete memory devices 112 (FIG. 1) within a graphics subsystem 114 (FIG. 1) in accordance with one embodiment of the present invention. The timing diagram illustrates the burst scenario discussed above. A data burst is a relatively high-bandwidth transmission over a short period of time relative to the refresh clock rate.

During normal operation of the graphics subsystem 114 (FIG. 1) (e.g. graphics subsystem 114 (FIG. 1) is not in the low power state), a new image frame 340 generated by the graphics processing unit 110 (FIG. 1) is stored in the frame buffer 222 (FIG. 2A) and contemporaneously (e.g., within a few milliseconds) copied into the dedicated copy buffer 229 (FIG. 2A). Thereafter, the intermediary buffer 228 (FIG. 2A) receives a plurality of bursts of portions of the copied image frame from the dedicated copy buffer 229 (FIG. 2A).

At the time of generation 330 of a new image frame 340 by the graphics processing unit 110 (FIG. 1), all of the plurality of memory devices 112 (FIG. 1) are in a powered on state 336. All of the plurality of memory devices 112 (FIG. 1) remain in the powered on state 336 until the new image frame 340 has been copied to the first memory device 112 (FIG. 1). The new image frame 340 is copied to the first memory device 112 (FIG. 1) after the new image frame 340 is stored in the frame buffer 222 (FIG. 2A) and contemporaneously (e.g., within a few milliseconds) copied into the dedicated copy buffer 229 (FIG. 2A) by the loader circuit 220 (FIG. 2A).

After the new image frame 340 is copied 332 into the dedicated copy buffer 229 (FIG. 2A) by the loader circuit 220 (FIG. 2A), all of the plurality of memory devices 112 (FIG. 1), except for the first memory device 112 (FIG. 1), are placed in a powered down state 338. The first memory device 112 (FIG. 1) begins a plurality of bursts of portions of the new image frame 340 into the intermediary buffer 228 (FIG. 2A). While the first memory device 112 (FIG. 1) is bursting portions of the new image frame 340, the first memory device 112 (FIG. 1) is in a powered on state 336. In between the plurality of bursts of portions of the new image frame 340, the first memory device 112 (FIG. 1) may be placed in a powered down state 338. The entirety of the new image frame 340 will be burst in portions into the intermediary buffer 228 (FIG. 2A) over one duty cycle of the system 100 (FIG. 1).

Effectively, all discrete memory devices 112 (FIG. 1) are in a powered down state 338 in between the plurality of bursts. For example, in this particular embodiment, memory devices 112 (FIG. 1) to which Partition1, Partition2, and Partition3 are mapped are in a powered down state 338 after the new image frame 340 is copied 332 into the dedicated copy buffer 229 (FIG. 2A), while the first memory device 112 (FIG. 1) to which Partition0 is mapped is in a powered down state 338 in between the plurality of bursts. After bursting 334 the new image frame 340 into the intermediary buffer 228 (FIG. 2A), the burst cycle repeats for a consecutive new image frame 342. The bursting scenario results in additional power savings for the system 100 (FIG. 1). The clocked output 226 (FIG. 2A) supplies frame data that was burst into the intermediary buffer 228 (FIG. 2A) to the display device 116 (FIG. 1) at a refresh clock rate that is suitable for the display device 116 (FIG. 1).

Figure 4:
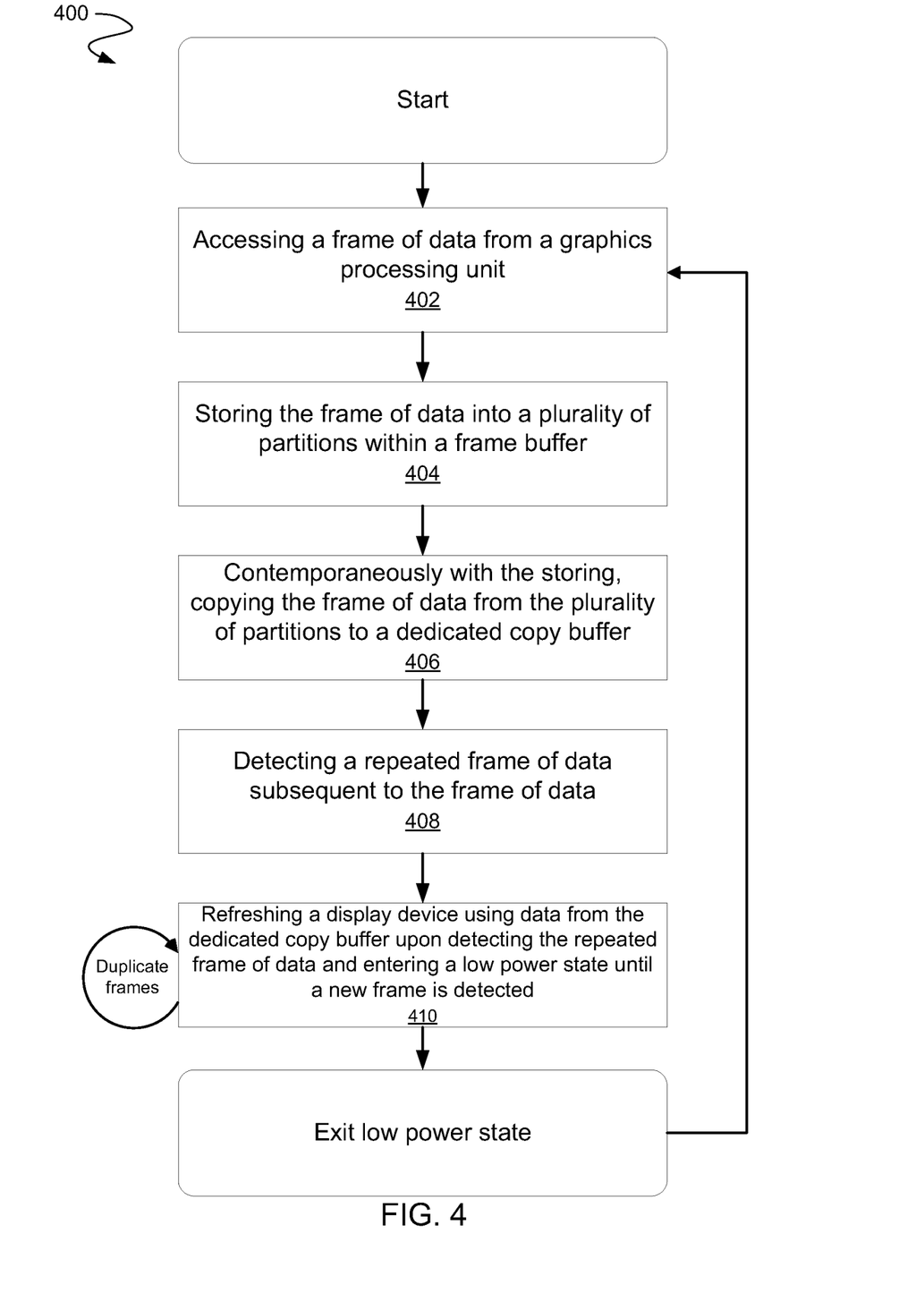
FIG. 4 depicts a flowchart of an exemplary process of generating a refresh signal, according to some embodiments of the present invention.

FIG. 4 depicts a flowchart of an exemplary process of generating a refresh signal, according to some embodiments of the present invention. In a block 402, a frame of data is accessed from a graphics processing unit. In an embodiment, the graphics processing unit is within a system.

For example, FIG. 2A depicts a frame of data being accessed from the graphics processing unit within the system. In some embodiments, the graphics processing unit is operable to generate the frame of data. For example, the graphics processing unit manipulates and alters memory in such a way so as to accelerate the building of frame data in a frame buffer intended for output to a display.

In a block 404, the frame of data is stored into a number of partitions with the frame buffer. The number of partitions within the frame buffer correspond to a number of memory devices. For example, FIG. 2A depicts four partitions within the frame buffer in the graphics subsystem, Partition0, Partition1, Partition2, and Partition3. Each of the partitions corresponds to a discrete memory device within the graphics subsystem (See FIG. 1). For example, Partition0 corresponds to a Memory0, Partition 1 corresponds to a Memory1, Partition2 corresponds to a Memory2, and Partition3 corresponds to a Memory3.

In a block 406, contemporaneously (e.g., within a few milliseconds) with storing the frame of data into the number of partitions within the frame buffer, the frame of data is opportunistically copied from the number of partitions to a dedicated copy buffer.

For example, FIG. 2A depicts a pathway for copying the frame of data from the frame buffer to the dedicated copy buffer via a loader circuit. The dedicated copy buffer is mapped to a first memory device of the number of discrete memory devices. For example, the dedicated copy buffer is mapped to a first discrete memory device, the same discrete memory device to which Partition0 is mapped.

The dedicated copy buffer is operable to store new image frames generated by the graphics processing unit. Upon the graphics processing unit generating a new image frame, the new image frame is stored in the frame buffer and contemporaneously (e.g., within a few milliseconds) copied into the dedicated copy buffer by the loader circuit. The dedicated copy buffer contains a bit for bit copy of the image frame stored in the frame buffer. Because the dedicated copy buffer is mapped to a first discrete memory device of the number of memory devices, a copy of the image frame resides on an individual discrete memory device. The dedicated copy buffer is transparent to an operating system controlling the system.

The loader circuit is coupled between the frame buffer and the dedicated copy buffer. The loader circuit is operable to copy new image frames from the frame buffer to the dedicated copy buffer responsive to the new image frames being copied into the frame buffer. Once the graphics processing unit has generated a new image frame and stored it in the frame buffer, the loader circuit copies the new image frame from the frame buffer into the dedicated copy buffer. In an embodiment, copying the frame of data from the number of partitions to the dedicated copy buffer includes bursting the frame of data from the frame buffer to the dedicated copy buffer via the loader circuit.

In a block 408, a repeated frame of data subsequent to the frame of data is detected. For example, the graphics subsystem includes detection logic to detect when the graphics processing unit generates a frame of data identical to a previously generated frame of data.

In a block 410, a display device is refreshed using data from the dedicated copy buffer upon the graphics subsystem detecting the repeated frame of data. Upon detection of the repeated frame of data, the graphics subsystem enters a low power state. In the low power state, one or more partitions of the number of partitions are powered down.

For example, in FIG. 2A, the graphics subsystem enters a low power state upon the graphics subsystem detecting a repeated image frame generated by the graphics processing unit. Upon detecting a repeated image frame, all of the number of memory devices, except for the first memory device, are powered down. In the low power state all partitions are powered down except for the first partition and the loader circuit no longer copies an image frame from the frame buffer into the dedicated copy buffer. The intermediary buffer continues to receive a number of bursts of a portion of the image frame during a portion of a duty cycle of the system from the dedicated copy buffer. In other words, the dedicated copy buffer is operable for providing image frames to the clocked output during the low power state. Partition1, Partition2, and Partition3 are powered down during the low power state. Partition0 remains active because it is mapped to the dedicated copy buffer which is operable for providing image frames to the clocked output during the low power state.

In an embodiment, refreshing the display device includes continuing to refresh the display device with the frame of data from the dedicated copy buffer while in the low power state. For example, in FIG. 2A, the display device is refreshed with the frame of data copied from the frame buffer to the dedicated copy buffer while in the low power state.

In an embodiment, the graphics subsystem remains in the low power state upon detection of a consecutive repeated frame of data. The graphics subsystem exits the low power state upon detection of a new frame of data. For example, in FIG. 2A, the graphics subsystem will continue to remain in the low power state upon detection of a consecutive repeated image frame. The graphics subsystem exits the low power state once the graphics subsystem detects a new image frame generated by the graphics processing unit.

In an embodiment, refreshing the display device includes periodically bursting data from the dedicated copy buffer to an intermediary buffer of the clocked output circuit. The clocked output circuit refreshes the display device by generating a refresh signal by reading contents of the intermediary buffer and supplying frame data at a refresh clock rate that is suitable for the display device.

For example, in FIG. 2A, the new image frame generated by the graphics processing unit is stored in the frame buffer and contemporaneously (e.g., within a few milliseconds) copied into the dedicated copy buffer. Thereafter, the intermediary buffer receives a number of bursts of portions of the copied image frame from the dedicated copy buffer. The data burst into the intermediary buffer is read by the clocked output and used to generate a refresh signal at a refresh clock rate suitable for the display device.

Figure 5:
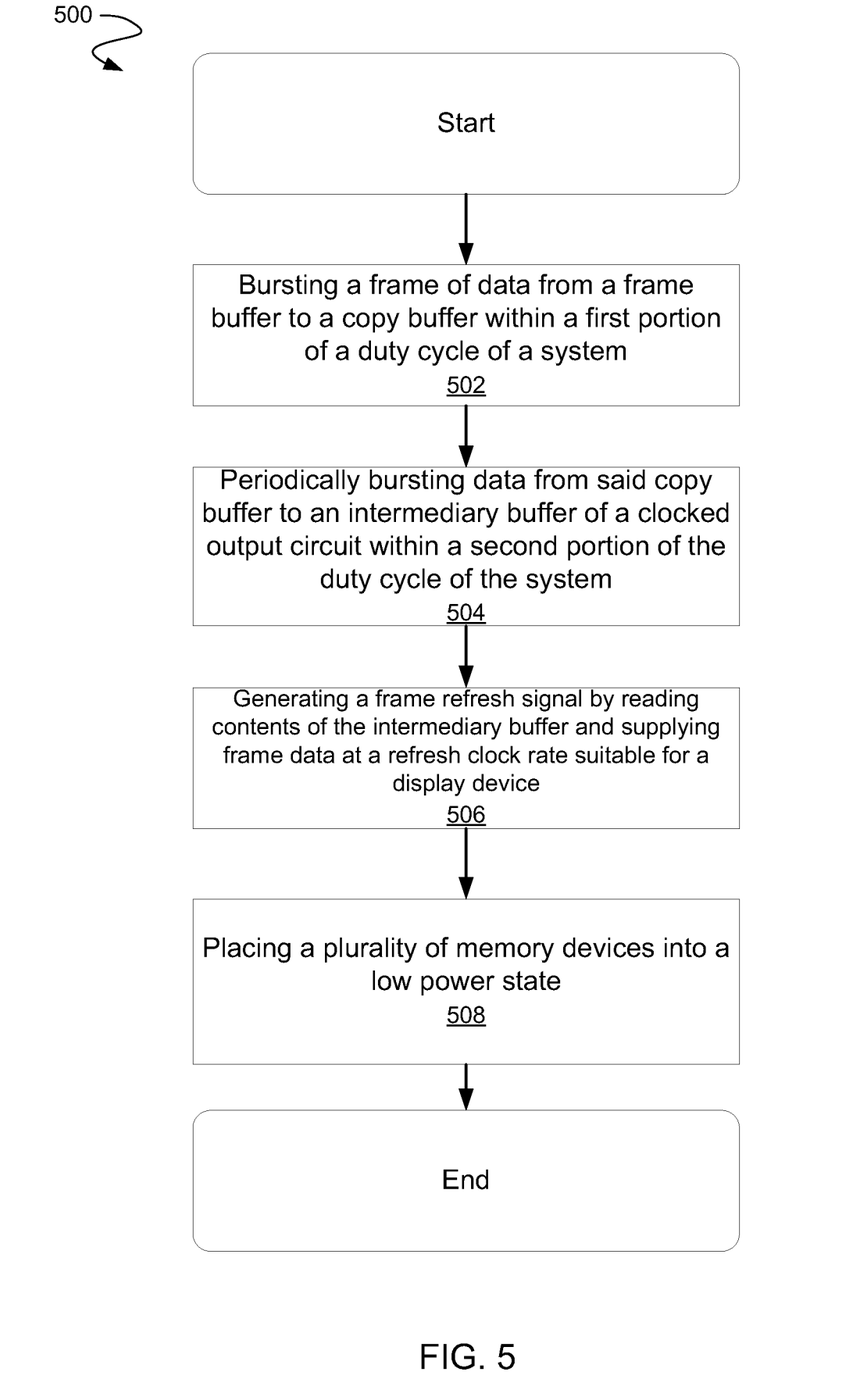
FIG. 5 depicts a flowchart of an exemplary process of supplying frame data for display, according to some embodiments of the present invention.

FIG. 5 depicts a flowchart of an exemplary process of supplying frame data for display, according to some embodiments of the present invention. In a block 502, a frame of data is burst from a frame buffer to a copy buffer within a first portion of a duty cycle of a system. The frame buffer includes an address space that is mapped to a number of partitions, with each partition corresponding to a respective discrete memory device of a number of memory devices. The address space is interleaved across the number of partitions. The dedicated copy buffer also includes an address space mapped to a first partition corresponding to a first memory device.

For example, in FIG. 3B, a new image frame generated by the graphics processing unit is stored in the frame buffer and is burst into the dedicated copy buffer. The new image frame is burst into the dedicated copy buffer during a first portion of the duty cycle of the system. Referring to FIG. 2A, the frame buffer includes an address space mapped to four partitions: Partition0, Partition1, Partition2, and Partition3. Each of the four partitions is mapped to a respective discrete memory device within the graphics subsystem. The dedicated copy buffer is solely mapped to Partition0, corresponding to the first respective discrete memory device within the graphics subsystem.

In an embodiment, the frame of data is rendered by a graphics processing unit within the graphics subsystem. After rendering the frame of data, the frame of data is copied into the frame buffer. For example, in FIG. 2A, the graphics processing unit manipulates and alters memory in such a way so as to accelerate the building of frame data in a frame buffer intended for output to a display.

In an embodiment, bursting the frame of data is responsive to copying the frame of data into the frame buffer. For example, in FIG. 3B, the frame of data is burst from the frame buffer into the dedicated copy buffer responsive to the frame of data being copied into the frame buffer after being rendered by the graphics processing unit.

In a block 504, data is periodically burst from the copy buffer to an intermediary buffer of a clocked output circuit within a second portion of the duty cycle of the system. The clocked output circuit is operable to refresh a display device. For example, in FIG. 3B, the intermediary buffer receives a plurality of bursts of portions of the copied image frame from the dedicated copy buffer during the second portion of the system's duty cycle. After the second portion of the system's duty cycle is complete, one complete frame of data will have been burst into the intermediary buffer.

It can be appreciated that block 502 and block 504 are not mutually exclusive. For example, in FIG. 3B a new image frame generated by the graphics processing unit can be burst from the frame buffer to the copy buffer, while simultaneously the intermediary buffer receives a plurality of bursts of portions of the copied image frame from the dedicated copy buffer.

In a block 506, a frame refresh signal is generated by reading the contents of the intermediary buffer and frame data is supplied at a refresh clock rate suitable for the display device. For example, in FIG. 2A, the intermediary buffer is operable to buffer data from the dedicated copy buffer prior to the data being used to drive the display device by the clocked output. The clocked output reads the data contents of the intermediary buffer and supplies frame data to the display device at a refresh clock rate that is suitable for the display device.

In a block 508, a number of memory devices, except for the first memory device, are placed into a low power state during the second portion of the system's duty cycle. The first memory device is placed into the low power state when not bursting data to the intermediary buffer. All of the number of memory devices are powered on during the first portion of the system's duty cycle.

For example, in FIG. 3B, at the time of generation of a new image frame by the graphics processing unit, all of the plurality of memory devices are in a powered on state. All of the plurality of memory devices remain in the powered on state until the new image frame has been copied to the first memory device. The new image frame is copied to the first memory device after the new image frame is stored in the frame buffer and contemporaneously (e.g., within a few milliseconds) copied into the dedicated copy buffer by the loader circuit.

After the new image frame is copied into the dedicated copy buffer by the loader circuit, all of the plurality of memory devices, except for the first memory device, are placed in a powered down state. The first memory device begins a plurality of bursts of portions of the new image frame into the intermediary buffer. While the first memory device is bursting portions of the new image frame, the first memory device is in a powered on state. In between the plurality of bursts of portions of the new image frame, the first memory device is placed in a powered down state. The entirety of the new image frame will be burst in portions into the intermediary buffer over one duty cycle of the system.

Effectively, all discrete memory devices are in a powered down state in between the plurality of bursts. For example, in this particular embodiment, memory devices to which Partition1, Partition2, and Partition3 are mapped are in a powered down state after the new image frame is copied into the dedicated copy buffer, while the first memory device to which Partition0 is mapped is in a powered down state in between the plurality of bursts. After bursting the new image frame into the intermediary buffer, the burst cycle repeats for a consecutive new image frame. The bursting scenario results in additional power savings for the system. The clocked output supplies frame data that was burst into the intermediary buffer to the display device at a refresh clock rate that is suitable for the display device.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

What is claimed is:

1. A system for driving a display, said system comprising:
    a frame buffer comprising a plurality of partitions respectively mapped to a plurality of discrete memory devices, wherein said frame buffer is operable to store a plurality of image frames from a graphics processing unit;
    a dedicated copy buffer mapped to a first memory device of said plurality of discrete memory devices, said first memory device corresponding to a first partition of said plurality of partitions, wherein said dedicated copy buffer is operable to store copies of at least one new image frame of said plurality of image frames;
    a loader circuit coupled to said frame buffer and said dedicated copy buffer, said loader circuit operable to copy new image frames from said frame buffer to said dedicated copy buffer responsive to said at least one new image frame being generated by said graphics processing unit; and
    a clocked output circuit configured to receive an image frame from said dedicated copy buffer and operable to generate a clocked output and to drive a display device therewith, wherein at least one of said plurality of discrete memory devices other than said first memory device is powered down in response to detecting a repeated image frame from said graphics processing unit.

2. The system of claim 1 wherein said dedicated copy buffer is operable for providing image frames to said clocked output during a low power state.

3. The system of claim 2, wherein all of said plurality of memory devices, except for said first memory device, are powered down during said low power state.

4. The system of claim 1, wherein said graphics processing unit is coupled to said frame buffer and operable to generate image frames for storage therein.

5. The system of claim 1, wherein said plurality of partitions are interleaved across an address space of said frame buffer.

6. The system as described in claim 1, further comprising:
    an intermediary buffer disposed between said dedicated copy buffer and said clocked output circuit, wherein said intermediary buffer receives a plurality of bursts of a portion of said image frame from said dedicated copy buffer during a portion of a duty cycle of said system while all other memory devices other than said first memory device is powered down.

7. The system as described in claim 6, wherein said first memory device is in a low power state in between said plurality of bursts such that one or more of said plurality of partitions is powered down.

8. The system as described in claim 7, wherein said intermediary buffer is operable to buffer data from said dedicated copy buffer prior to said data being used to drive said display device by said clocked output; and
    further wherein said clocked output supplies frame data to said display device at a refresh clock rate suitable for said display device.

9. The system as described in claim 1, wherein said dedicated copy buffer is transparent to an operating system controlling said system.

10. A method of generating a refresh signal, said method comprising:
    accessing a frame of data from a graphics processing unit;
    storing said frame of data into a plurality of partitions within a frame buffer, wherein said plurality of partitions is mapped to a plurality of discrete memory devices;
    if said frame of data comprises a new frame of data, substantially contemporaneously with said storing, copying said new frame of data from said plurality of partitions to a dedicated copy buffer mapped to a first memory device of said plurality of discrete memory devices, wherein said copying said new frame of data to said dedicated copy buffer comprises bursting said new frame of data from said frame buffer to said dedicated copy buffer;

detecting a repeated frame of data subsequent to said frame of data;

powering down at least one discrete memory device of said plurality of discrete memory devices other than said first discrete memory device in response to said detecting said repeated frame of data; and refreshing a display device using data from said dedicated copy buffer via said intermediary buffer upon said detecting said repeated frame of data and entering a low power state wherein one or more partitions of said plurality of partitions are powered down.

11. The method of claim 10, wherein said refreshing said display device further comprises continuing to refresh said display device with said frame of data from said dedicated copy buffer while in said low power state.

12. The method of claim 11 further comprising:
remaining in said low power state upon detection of a consecutive repeated frame of data; and
exiting said low power state upon detection of a new frame of data.

13. The method of claim 10 wherein said refreshing said display device further comprises:
periodically bursting data from said dedicated copy buffer to an intermediary buffer of a clocked output circuit, said clocked output circuit operable to refresh said display device; and
generating a refresh signal by reading contents of said intermediary buffer and supplying frame data at a refresh clock rate suitable for said display device.

14. The method as described in claim 10, further comprising:
receiving a plurality of bursts of a portion of said image frame from said dedicated copy buffer at an intermediary buffer coupled between said dedicated copy buffer and a clock output of a clock output circuit during a portion of a duty cycle of said system while all other memory devices other than said first memory device is powered down.

15. The method as described in claim 14, wherein said first memory device is in said low power state in between said plurality of bursts.

16. The method as described in claim 10, wherein said dedicated copy buffer is transparent to an operating system controlling said system.

* * * * *